(12) United States Patent
Furudate et al.

(10) Patent No.: US 9,833,776 B2
(45) Date of Patent: Dec. 5, 2017

(54) DISPERSION LIQUID OF TITANIUM OXIDE-TUNGSTEN OXIDE COMPOSITE PHOTOCATALYTIC FINE PARTICLES, PRODUCTION METHOD FOR SAME, AND MEMBER HAVING PHOTOCATALYTIC THIN FILM ON SURFACE THEREOF

(71) Applicant: Shin-Etsu Chemical Co., Ltd., Tokyo (JP)

(72) Inventors: Manabu Furudate, Kamisu (JP); Tomohiro Inoue, Kamisu (JP); Yoshitsugu Eguchi, Kamisu (JP); Takashi Kobayashi, Kamisu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/029,902

(22) PCT Filed: Sep. 29, 2014

(86) PCT No.: PCT/JP2014/075857
§ 371 (c)(1),
(2) Date: Apr. 15, 2016

(87) PCT Pub. No.: WO2015/056556
PCT Pub. Date: Apr. 23, 2015

(65) Prior Publication Data
US 2016/0250621 A1    Sep. 1, 2016

(30) Foreign Application Priority Data
Oct. 16, 2013    (JP) .................................. 2013-215381

(51) Int. Cl.
| | | |
|---|---|---|
| *B01J 23/888* | (2006.01) | |
| *C01G 41/02* | (2006.01) | |
| *C09D 1/00* | (2006.01) | |
| *C09D 5/16* | (2006.01) | |
| *C01G 23/053* | (2006.01) | |
| *C09D 7/12* | (2006.01) | |
| *B01J 21/06* | (2006.01) | |
| *B01J 23/72* | (2006.01) | |
| *B01J 35/00* | (2006.01) | |
| *B01J 35/02* | (2006.01) | |
| *B01J 37/00* | (2006.01) | |
| *B01J 37/04* | (2006.01) | |
| *B01J 37/08* | (2006.01) | |

(52) U.S. Cl.
CPC ........... *B01J 23/888* (2013.01); *B01J 21/063* (2013.01); *B01J 23/72* (2013.01); *B01J 35/002* (2013.01); *B01J 35/004* (2013.01); *B01J 35/023* (2013.01); *B01J 37/0036* (2013.01); *B01J 37/04* (2013.01); *B01J 37/08* (2013.01); *C01G 23/053* (2013.01); *C01G 41/02* (2013.01); *C09D 1/00* (2013.01); *C09D 5/16* (2013.01); *C09D 7/1258* (2013.01); *C01P 2002/50* (2013.01); *C01P 2002/54* (2013.01); *C01P 2004/61* (2013.01); *C01P 2004/62* (2013.01); *C01P 2004/64* (2013.01)

(58) Field of Classification Search
CPC ....................................................... B01J 23/888
See application file for complete search history.

(56) References Cited

U.S. PATENT DOCUMENTS

| | | |
|---|---|---|
| 8,536,084 B2 | 9/2013 | Hashimoto et al. |
| 2005/0271892 A1 | 12/2005 | Ogata et al. |
| 2009/0093361 A1* | 4/2009 | Sakatani ............ B01D 53/8687 502/309 |
| 2014/0309103 A1 | 10/2014 | Furudate et al. |

FOREIGN PATENT DOCUMENTS

| | | |
|---|---|---|
| EP | 0 937 398 A1 | 8/1999 |
| JP | 64-3020 A | 1/1989 |
| JP | 2-255532 A | 10/1990 |

(Continued)

OTHER PUBLICATIONS

Hikari-shokubai hyoujun kenkyuho, "Standard research methods for photocatalysts", published by Tokyo Tosho, Jan. 25, 2005, total 14 pages.
International Search Report for PCT/JP2014/075857 dated Nov. 25, 2014.
Sanka chitan, "Titanium oxide", published by Gihodo Shuppan, May 10, 1997, total 15 pages.

Primary Examiner — Melvin C Mayes
Assistant Examiner — Stefanie Cohen
(74) Attorney, Agent, or Firm — Birch, Stewart, Kolasch & Birch, LLP

(57) ABSTRACT

The present invention relates to a dispersion liquid of titanium oxide-tungsten oxide composite photocatalytic fine particles that is characterized by having two types of photocatalytic fine particles dispersed in an aqueous dispersion medium, the fine particles including i) fine particles of titanium oxide that contain a peroxotitanium component and a copper component and ii) fine particles of tungsten oxide. The present invention can provide a dispersion liquid and the like that can be used to conveniently manufacture a photocatalytic thin film that demonstrates photocatalytic activity even within visible light (400-800 nm) only, exhibits high antibacterial performance, is highly durable, and wherein the state of copper coordination is stable against exposure to heat and ultraviolet rays and is not easily modified. The dispersion liquid is a dispersion liquid of titanium oxide-tungsten oxide composite photocatalytic fine particles that contains copper-containing titanium oxide fine particles.

11 Claims, No Drawings

(56) References Cited

FOREIGN PATENT DOCUMENTS

| | | |
|---|---|---|
| JP | 6-65012 A | 3/1994 |
| JP | 6-279725 A | 10/1994 |
| JP | 7-247119 A | 9/1995 |
| JP | 8-67835 A | 3/1996 |
| JP | 10-67516 A | 3/1998 |
| JP | 10-182152 A | 7/1998 |
| JP | 11-349423 A | 12/1999 |
| JP | 2004-182558 A | 7/2004 |
| JP | 2005-170687 A | 6/2005 |
| JP | 2007-131551 A | 5/2007 |
| JP | 2009-148700 A | 7/2009 |
| JP | 2009-179497 A | 8/2009 |
| JP | 2009-226299 A | 10/2009 |
| JP | 2010-412 A | 1/2010 |
| JP | 2012-250237 A | 12/2012 |
| JP | 2013-86010 A | 5/2013 |
| JP | 2013-126654 A | 6/2013 |
| WO | WO 2004/041723 A1 | 5/2004 |
| WO | WO 2009017458 A1 * | 2/2009 ............. B82Y 30/00 |

* cited by examiner

DISPERSION LIQUID OF TITANIUM OXIDE-TUNGSTEN OXIDE COMPOSITE PHOTOCATALYTIC FINE PARTICLES, PRODUCTION METHOD FOR SAME, AND MEMBER HAVING PHOTOCATALYTIC THIN FILM ON SURFACE THEREOF

TECHNICAL FIELD

The present invention relates to a titanium oxide-tungsten oxide composite photocatalytic fine particle dispersion that contains copper-containing titanium oxide fine particles used in various types of catalysts, co-catalysts and antibacterial agents, to a method for producing such a dispersion, and to a member having on a surface thereof a photocatalytic thin-film formed using such a dispersion. More particularly, the invention relates to a titanium oxide-tungsten oxide composite photocatalytic fine particle dispersion that contains copper-containing titanium oxide fine particles and can easily produce a photocatalytic thin-film which manifests a photocatalytic activity even on exposure only to visible light (400 to 800 nm), in which the coordination state of copper is stable and not easily altered on exposure to heat or ultraviolet radiation and which has a high durability, to a method for producing such a dispersion, and to a member having on a surface thereof a photocatalytic thin-film formed using such a dispersion.

BACKGROUND ART

Elemental copper and copper-containing metal oxides are widely employed in industry and see frequent use particularly in the fields of co-catalysts and antibacterial agents. Applications as co-catalysts have included, in recent years, use for the visible-light sensitization of photocatalysts, in asymmetry catalysts for organic synthesis, in catalysts for the atom transfer radical polymerization (ATRP) of polymeric compounds, and in steam-reforming catalysts for various types of organic compounds. Also, it has long been known that elemental copper and copper ions have antibacterial properties, and the mechanisms that lead up to bacteriostasis and bacterial death via enzyme inhibition, membrane protein denaturation and structural protein denaturation in cell organelles of the target bacteria have continued to be studied even recently. Copper-containing catalysts produced with these effects in mind are manufactured, for example, by adding copper ions to a carrier having cation exchangeability and immobilizing the copper ions by ion exchange, or by supporting copper oxide in the form of fine particles on a carrier (JP-A H06-065012: Patent Document 1; JP-A H11-349423: Patent Document 2; JP-A 2007-131551: Patent Document 3), and are used in a wide variety of hygiene products. However, in all of these copper-containing metal oxides, the copper composition changes readily depending on factors in the surrounding environment, such as light, heat and moisture. Hence, while such catalyst sensitizing effects and antibacterial activities can all be expected to be high initially, they rapidly deteriorate over about several weeks, resulting in a loss of efficacy that presents a problem in applications where such effects are required to persist over a long period of time.

Titanium oxide is used in various applications, including pigments, UV blockers, catalysts, photocatalysts, catalyst carriers, adsorbents, ion-exchange agents, fillers, reinforcing agents, starting materials for ceramics, as a precursor for complex oxides such as perovskite-type complex oxides, and in undercoats for magnetic tape.

Of these, photocatalytic titanium oxide fine particles are a type of material having a photocatalytic action when irradiated with light that includes ultraviolet light at wavelengths of up to 400 nm. As used herein, "photocatalytic action" refers to an action where holes and electrons that have been generated by excitation with UV light at up to 400 nm and have diffused to a surface carry out redox reaction together with molecules adsorbed to that surface. Organic matter adsorbed to the titanium oxide surface is decomposed by these redox reactions. By coating titanium oxide fine particles having this photocatalytic action onto a substrate surface so as to form a photocatalytic thin-film and irradiating the coated surface with excitation light, harmful organic matter adsorbed to the surface can be decomposed. Hence, titanium oxide fine particles are widely used in applications such as the cleaning, deodorization and disinfection of substrate surfaces. Titanium oxide fine particles are often used in combination with copper compounds to increase such antibacterial activity and other properties (JP-A H08-067835: Patent Document 4). Composite materials of copper compounds and titanium oxide catalysts are especially promising in applications where antibacterial properties are required.

To increase the photocatalytic activity, there is a desire that the contact surface area between the photocatalyst particles and the substance to be decomposed be made larger. Satisfying this desire requires that the average particle size of the titanium oxide fine particles within the titanium oxide dispersion be 50 nm or less.

Common methods for producing titanium oxide fine particles include industrial processes such as the sulfate process and chloride process which use ilmenite ore or rutile ore as the raw material (Sanka chitan [Titanium oxide], published by Gihodo Shuppan: Non-Patent Document 1). Other methods include a hydrolysis-calcination process, reaction in an organic solvent, and a solid phase process (Hikari-syokubai hyoujun kenkyuho [Standard research methods for photocatalysts], published by Tokyo Tosho: Non-Patent Document 2). These titanium oxide fine particles are coated onto a substrate surface. To retain the decorative qualities of the substrate to be coated, ultrafine dispersion treatment in a liquid coating is carried out. Examples of common fine dispersion treatment methods include methods which use a wet dispersing machine and a dispersing agent to disperse within a dispersion medium a finely divided titanium oxide powder that has been synthesized (JP-A H01-003020: Patent Document 5; JP-A H06-279725: Patent Document 6; JP-A H07-247119: Patent Document 7; JP-A 2004-182558: Patent Document 8), and methods which stably disperse titanium oxide fine particles within a dispersion medium by surface treating the titanium oxide (JP-A 2005-170687: Patent Document 9; JP-A 2009-179497: Patent Document 10). However, one problem with these methods is that because ultrafine particles having an average particle size of 50 nm or less have a tendency to agglomerate, considerable effort is required to achieve a dispersion down to the primary particles; in some cases dispersion down to the primary particles is impossible. Another problem is that the particles are surface-treated with inorganic or organic ingredients and dispersing agents such as surfactants are added in order to increase the dispersion stability; however, the photocatalyst surface ends up coated with these substances, which interferes with the appearance of a photocatalytic activity.

In addition, a method for producing an anatase-type titanium oxide dispersion having long-term stability that entails the hydrothermal treatment of a peroxotitanic solution obtained by dissolving titanium hydroxide in hydrogen peroxide (JP-A H10-067516: Patent Document 11), a method for producing a rutile-type titanium oxide sol (JP-A H02-255532: Patent Document 12), and a method for producing a titanium oxide sol (JP-A H10-182152: Patent Document 13) have been disclosed. In these dispersions, the titanium oxide fine particles are dispersed to an average particle size of 50 nm or less without using surface treatment or a dispersing agent, and photocatalytic coating films obtained by coating such dispersions onto a substrate have an excellent transparency and exhibit activity under UV irradiation. Although these titanium oxides do exhibit a good photocatalytic activity when irradiated with the ultraviolet region light having a relatively short wavelength (10 to 400 nm) included in, for example, sunlight, it is sometimes difficult for sufficient photocatalytic activity to appear within indoor spaces illuminated with light sources that supply for the most part light in the visible region (wavelength, 400 to 800 nm) such as fluorescent lamps.

One visible light-sensitive photocatalyst capable of obtaining sufficient photocatalytic effects even within indoor spaces that is worthy of note is a tungsten oxide photocatalyst (JP-A 2009-148700: Patent Document 14). In addition, a tungsten oxide photocatalyst with a copper compound supported on the surface has been disclosed (JP-A 2009-226299: Patent Document 15).

SUMMARY OF THE INVENTION

Problems to be Solved by the Invention

In light of the above, it is an object of the invention to provide a titanium oxide-tungsten oxide composite photocatalytic fine particle dispersion that contains copper-containing titanium oxide fine particles and can easily produce a photocatalytic thin-film which manifests a photocatalytic activity even on exposure only to visible light (400 to 800 nm), which exhibits a high antibacterial activity, in which the coordination state of copper is stable and not easily altered on exposure to heat or ultraviolet radiation, and which has a high durability. Further objects of the invention are to provide a method for producing such a dispersion, and a member having on a surface thereof a photocatalytic thin-film formed using such a dispersion.

Means for Solving the Problems

As a result of extensive investigations, the inventors have discovered that a titanium oxide-tungsten oxide composite photocatalytic fine particle dispersion of two kinds of photocatalytic fine particles—(i) titanium oxide fine particles containing a peroxotitanium component and a copper component, and (ii) tungsten oxide fine particles—dispersed in an aqueous dispersion medium can easily produce a photocatalytic thin-film which manifests a photocatalytic activity even on exposure only to visible light (400 to 800 nm), which exhibits high antibacterial properties, in which, particularly when the copper component has entered into solid solution within the titanium oxide fine particles, the coordination state of copper is stable and not easily altered on exposure to heat or ultraviolet radiation, and which has a high durability.

Such a titanium oxide-tungsten oxide composite photocatalytic fine particle dispersion in which the copper component has entered into solid solution in the titanium oxide fine particles can be prepared by, for example, a production method that mixes a copper-containing titanium oxide fine particle dispersion of peroxotitanic acid component and copper component-containing titanium oxide fine particles obtained by hydrothermally reacting a copper compound-containing aqueous solution of peroxotitanic acid under high pressure and heat to effect crystallization with a dispersion, separately prepared beforehand, of tungsten oxide fine particles that are a visible light-sensitive photocatalyst.

As mentioned above, Patent Document 15 discloses a tungsten oxide photocatalytic material having a copper compound supported on the surface. However, this photocatalytic material requires the use of a large amount of tungsten, which is a rare metal, lacks sufficient stability to the outside environment, including exposure to heat or ultraviolet irradiation, and requires that the copper compound be supported on the surface of the tungsten oxide under specific conditions in order to increase performance, as a result of which the production conditions have a complexity that tends to give rise to variability in the photocatalytic performance.

By contrast, the titanium oxide-tungsten oxide composite photocatalytic fine particle dispersion of the invention, by forming a composite photocatalyst of titanium oxide and tungsten oxide, maintains or improves the performance as a photocatalyst while holding down the amount of the rare metal tungsten that is used. In addition, by using the above production method of the invention, because the copper component is present in a state that has entered into solid solution within the titanium oxide fine particles, the photocatalyst thin-film that is formed with this dispersion exhibits a high photocatalytic activity under visible light. At the same time, the coordination state of copper is stable and not easily altered on exposure to heat or ultraviolet radiation, thus also enabling the durability to be increased. Finally, the composite of titanium oxide and tungsten oxide can be formed by a simple and convenient method that merely involves mixing the copper-containing titanium oxide fine particle dispersion together with the tungsten oxide fine particle dispersion.

Accordingly, this invention provides the following titanium oxide-tungsten oxide composite photocatalyst, a method for producing such a catalyst, and a member having a thin-film of the photocatalyst on the surface thereof.

[1] A titanium oxide-tungsten oxide composite photocatalytic fine particle dispersion characterized by comprising two kinds of photocatalytic fine particles dispersed in an aqueous dispersion medium: (i) titanium oxide fine particles containing a peroxotitanium component and a copper component, and (ii) tungsten oxide fine particles.

[2] The titanium oxide-tungsten oxide composite photocatalytic fine particle dispersion of [1] above, wherein the dispersed size of the titanium oxide fine particles (i) and the dispersed size of the tungsten oxide fine particles (ii), each expressed as a volume-based 50% cumulative distribution size ($D_{50}$) measured by dynamic laser light scattering, are respectively 5 to 30 nm and 5 to 1,000 nm.

[3] The titanium oxide-tungsten oxide composite photocatalytic fine particle dispersion of [1] or [2] above, wherein the content of the copper component within the titanium oxide fine particles (i), expressed as a molar ratio with titanium oxide (Ti/Cu), is from 1 to 1,000.

[4] The titanium oxide-tungsten oxide composite photocatalytic fine particle dispersion of any one of [1] to [3] above, wherein the copper component has entered into solid solution within the titanium oxide fine particles (i).

[5] The titanium oxide-tungsten oxide composite photocatalytic fine particle dispersion of any one of [1] to [4] above wherein, even after deterioration treatment of the titanium oxide fine particles (i) by 200 hours of exposure to ultraviolet light having a peak wavelength of 365 nm at 3 mW/cm$^2$ or by 2 hours of heating at 500° C., in measurement of the Cu—K edge XAFS (x-ray absorption fine structure) spectrum near an energy level of 9,000 eV, both of the following conditions are satisfied relative to before such deterioration treatment:

1) the absorption spectrum maximum peak observable within the range of 8,970 to 9,000 eV in an XANES (x-ray absorption near-edge structure) spectrum changes no more than 0.1 in relative absorption amount and changes no more than 5% in absorption energy value; and 2) in the radial structure function obtained by high-speed Fourier transformation of the $k^3\chi(k)$ Cu—K edge EXAFS (extended x-ray absorption fine structure) spectrum of the same measurement results, the position of the maximum peak within the range of 2 to 3 Å judged to be the first to second coordination sphere of copper changes no more than 5%.

[6] The titanium oxide-tungsten oxide composite photocatalytic fine particle dispersion of any one of [1] to [5] above which further comprises a binder.

[7] The titanium oxide-tungsten oxide composite photocatalytic fine particle dispersion of [6] above, wherein the binder is a silicon compound-based binder.

[8] A member having on a surface thereof a photocatalytic thin-film formed using the titanium oxide-tungsten oxide composite photocatalytic fine particle dispersion of any one of [1] to [7] above.

[9] A method of producing a titanium oxide-tungsten oxide composite photocatalytic fine particle dispersion, characterized by comprising the steps of:

(1) producing a copper compound-containing precursor aqueous solution from a starting titanium compound, a copper compound, a basic substance, a hydrogen peroxide and an aqueous dispersion medium;

(2) producing a copper-containing titanium oxide fine particle dispersion by heating the copper compound-containing precursor aqueous solution produced in Step (1) for 1 to 300 minutes at from 80 to 250° C. and under a pressure of from 0.12 to 4.5 MPa; and (3) mixing the copper-containing titanium oxide fine particle dispersion produced in Step (2) together with a tungsten oxide fine particle dispersion.

[10] The method of producing a titanium oxide-tungsten oxide composite photocatalytic fine particle dispersion according to [9] above, wherein the tungsten oxide fine particle dispersion used in Step (3) is produced by using a bead mill to finely grind and disperse a tungsten oxide powder in an aqueous dispersion medium.

[11] The method of producing a titanium oxide-tungsten oxide composite photocatalytic fine particle dispersion according to [9] or [10] above, wherein the copper-containing titanium oxide fine particle dispersion obtained in Step (2) has a peroxotitanium component content of from 0.05 to 2 wt % of the titanium oxide fine particles.

[12] The method of producing a titanium oxide-tungsten oxide composite photocatalytic fine particle dispersion according to [10] or [11] above, wherein the beads used in the bead mill are spherical zirconia beads having a diameter of from 5 to 100 μm.

Advantageous Effects of the Invention

This invention is thus able to provide a titanium oxide-tungsten oxide composite photocatalytic fine particle dispersion that contains copper-containing titanium oxide fine particles and can easily produce a photocatalytic thin-film which manifests a photocatalytic activity even on exposure only to visible light (400 to 800 nm), which exhibits a high antibacterial activity, in which the coordination state of copper is stable and not easily altered on exposure to heat or ultraviolet radiation, and which has a high durability. This invention is also able to provide a method for producing such a dispersion, and a member having on a surface thereof a photocatalytic thin-film formed using such a dispersion.

EMBODIMENT FOR CARRYING OUT THE INVENTION

The inventive titanium oxide-tungsten oxide composite photocatalytic fine particle dispersion, method for producing the same, and member having on a surface thereof a photocatalyst thin-film formed using the dispersion are described below in detail.

[Titanium Oxide-Tungsten Oxide Composite Photocatalytic Fine Particle Dispersion]

The titanium oxide-tungsten oxide composite photocatalytic fine particle dispersion of the invention, which can be obtained by the subsequently described method of production, is composed of two kinds of photocatalytic fine particles dispersed in an aqueous dispersion medium: (i) titanium oxide fine particles containing a peroxotitanium component and a copper component, and (ii) tungsten oxide fine particles.

Here, of the three types of titanium oxide fine particles that are generally known—rutile, anatase, and brookite-type titanium oxide fine particles, the use of chiefly anatase and rutile-type titanium oxide fine particles is preferred. "Chiefly" refers here to at least 50 wt %, preferably at least 70 wt %, more preferably at least 90 wt %, and may even be 100 wt %, of all the titanium oxide fine particle crystals.

An aqueous solvent is used as the aqueous dispersion medium in which the titanium oxide fine particles (i) and the tungsten oxide fine particles (ii) are dispersed. Examples of the aqueous solvent include water and mixed solvents of water and a hydrophilic organic solvent mixed together in any proportion. The water is preferably, for example, deionized water, distilled water, or pure water. The hydrophilic organic solvent is preferably, for example, an alcohol such as methanol, ethanol or isopropanol. The mixing proportion of the hydrophilic organic solvent in the aqueous dispersion medium is typically from 0 to 50 wt %, preferably from 0 to 20 wt %, and more preferably from 0 to 10 wt %. From the standpoint of productivity, cost and other considerations, pure water is most preferred.

The copper component within the titanium oxide fine particles (i) is included to increase the antibacterial activity and the visible light sensitivity of the photocatalyst thin-film. The copper component may be any derived from a copper compound, and is exemplified by metals, oxides, hydroxides, nitrates, sulfates, halides and complex compounds of copper. Any one or combination of two or more of these may be used.

The content of the copper component in the titanium oxide fine particles, expressed as a molar ratio with titanium oxide (Ti/Cu), is typically from 1 to 1,000, preferably from 10 to 200, and more preferably from 20 to 100. At a molar ratio below 1, the proportion of titanium oxide crystals included decreases and a sufficient photocatalytic effect may not appear. On the other hand, at more than 1,000, the visible light sensitivity may be inadequate.

Here, the copper component is not simply mixed with, adsorbed to or supported on the titanium oxide fine particles.

It is preferably included in such manner as to minimize separation or detachment from the titanium oxide fine particles, and is most preferably incorporated by being made to enter into solid solution within the crystal lattice of the titanium oxide fine particles. By having the copper component enter into solid solution, the coordination state of the copper is stable to and not easily altered by exposure to heat or ultraviolet radiation, thus making it possible to form a photocatalyst thin-film having a high durability. Such a solid solution state for the copper component can be obtained by the subsequently described method for producing a titanium oxide-tungsten oxide composition photocatalytic fine particle dispersion. It should be noted that it is acceptable for some of the copper component to separate and detach from the titanium oxide fine particles, and to dissolve and/or disperse within the dispersion.

The peroxotitanium component included within the titanium oxide fine particles (i) has the role of causing the titanium oxide fine particles to disperse well within the aqueous dispersion medium, and refers to peroxotitanium (Ti—O—O—Ti) bond-containing titanium oxide-based compounds (including peroxotitanium complexes). This peroxotitanium component is formed in the copper-containing titanium oxide fine particle dispersion production process consisting of steps (1) and (2) within the subsequently described method for producing a titanium oxide-tungsten oxide composite photocatalytic fine particle dispersion; that is, when the starting titanium compound, the basic substance and the hydrogen peroxide are reacted together within an aqueous dispersion medium.

Such a peroxotitanium component is preferably included not only within the titanium oxide fine particles (i), but also in the aqueous dispersion medium within which these fine particles are dispersed.

In particular, the peroxotitanium component content within the copper-containing titanium oxide fine particle dispersion obtained in steps (1) and (2) of the subsequently described method for producing a titanium oxide-tungsten oxide composite photocatalytic fine particle dispersion is typically from 0.05 to 2 wt %, and preferably from 0.05 to 1 wt %, of the total amount of titanium oxide fine particles. The reason is that, at a concentration below 0.05 wt %, the titanium oxide fine particles readily agglomerate, whereas at more than 2 wt %, the photocatalytic effect of the photocatalyst thin-film obtained from the dispersion may be inadequate.

In the titanium oxide-tungsten oxide composite photocatalytic fine particle dispersion, the titanium oxide fine particles (i) have a volume-based 50% cumulative distribution size ($D_{50}$) measured by dynamic laser light scattering (which size is also referred to below as the "average particle size") of preferably from 5 to 30 nm, more preferably from 5 to 20 nm, and even more preferably form 5 to 15 nm. This is because, at an average particle size below 5 nm, the photocatalytic activity may be inadequate, whereas at more than 30 nm, the titanium oxide is less likely to successfully form a composite with tungsten oxide. Instruments that may be used to measure the average particle size include, for example, the Nanotrac UPA-EX150 (Nikkiso Co., Ltd.) and the LA-910 (Horiba, Ltd.).

The tungsten oxide fine particles (ii) have a similarly measured average particle size of preferably from 5 to 1,000 nm, more preferably from 10 to 300 nm, and even more preferably from 50 to 200 nm. This is because, at an average particle size below 5 nm, the photocatalytic activity may be inadequate, whereas at more than 1,000 nm, the tungsten oxide fine particles tend to precipitate, making the tungsten oxide less likely to successfully form a composite with titanium oxide.

The respective average particle sizes for the titanium oxide fine particles (i) and for the tungsten oxide fine particles (ii) are generally measured prior to formation of a composite (that is, prior to mixture, in the state of separate dispersions containing one or the other of these two kinds of fine particles).

The total concentration of titanium oxide fine particles and tungsten oxide fine particles in the titanium oxide-tungsten oxide composite photocatalytic fine particle dispersion is preferably from 0.01 to 20 wt %, and more preferably from 0.5 to 10 wt %. Setting the total concentration within this range is convenient in that the dispersion can be used directly as is to form a photocatalytic thin-film of the required thickness.

[Method for Producing Titanium Oxide-Tungsten Oxide Composite Photocatalytic Fine Particle Dispersion]

In the inventive method for producing a titanium oxide-tungsten oxide composite photocatalytic fine particle dispersion, the dispersion is ultimately obtained in a state where two kinds of photocatalytic fine particles—(i) titanium oxide fine particles containing a peroxotitanium component and a copper component, and (ii) tungsten oxide fine particles—are dispersed within an aqueous dispersion medium. This method includes the following steps (1) to (3):

(1) producing a copper compound-containing precursor aqueous solution from a starting titanium compound, a copper compound, a basic substance, a hydrogen peroxide and an aqueous dispersion medium;

(2) producing a copper-containing titanium oxide fine particle dispersion by heating the copper compound-containing precursor aqueous solution produced in Step (1) at from 80 to 250° C. and under a pressure of from 0.12 to 4.5 MPa; and (3) mixing the copper-containing titanium oxide fine particle dispersion produced in Step (2) together with a tungsten oxide fine particle dispersion.

Step (1):

In Step (1), a copper compound-containing precursor aqueous solution is prepared by reacting a starting titanium compound, a copper compound, a basic substance and a hydrogen peroxide in an aqueous dispersion medium. The reaction method may be either a method that adds the basic substance to the starting titanium compound within the aqueous dispersion medium to form titanium hydroxide, removes impurity ions, adds hydrogen peroxide to effect dissolution, and then adds the copper compound, thereby giving a copper compound-containing precursor aqueous solution; or a method that adds the copper compound to the starting titanium compound within the aqueous dispersion medium, then adds the basic substance to form copper-containing titanium hydroxide, removes impurity ions, and subsequently adds hydrogen peroxide to effect dissolution, giving a copper compound-containing precursor aqueous solution.

Here, examples of the starting titanium compound include inorganic acid salts of titanium, such as hydrochlorides, nitrates, and sulfates; organic acid salts such as titanium salts of formic acid, citric acid, oxalic acid, lactic acid or glycolic acid; and the titanium hydroxide that settles out when hydrolysis is carried out by adding an alkali to any these aqueous solutions. These starting titanium compounds may be used singly or two or more may be used in combination.

With regard to the copper compound and aqueous dispersion medium, the copper compound and aqueous dispersion described above are each used in the amounts indicated above. The concentration of the starting titanium compound aqueous solution formed of the starting titanium compound and the aqueous dispersion medium is preferably not more than 60 wt %, and more preferably not more than 30 wt %. The concentration has no particular lower limit, although a concentration of at least 1 wt % is generally preferred.

The purpose of the basic substance is to render the starting titanium compound into titanium hydroxide, and also to stabilize the precursor ingredients within the aqueous dispersion medium. Illustrative examples include hydroxides of alkali metals or alkaline earth metals, such as sodium hydroxide and potassium hydroxide; and amine compounds such as ammonia, alkanolamines and alkylamines. The basic substance is added and used in an amount such as to bring the pH of the aqueous solution of the starting titanium compound to at least 7, and especially from 7 to 10. The basic substance may also be used together with the aqueous dispersion medium after first being rendered into an aqueous solution of a suitable concentration.

The hydrogen peroxide serves to dissolve the starting titanium compound or titanium hydroxide, and is generally used in the form of hydrogen peroxide water. The amount of hydrogen peroxide added is preferably set to from 1.5 to 10 moles per mole of titanium and copper combined. The reaction temperature when adding this hydrogen peroxide and dissolving the starting titanium compound or titanium hydroxide is preferably set to from 5 to 60° C., and the reaction time is preferably set to from 30 minutes to 24 hours.

The resulting copper compound-containing precursor aqueous solution may, for the sake of pH adjustment, for example, include an alkaline substance or an acidic substance. Illustrative examples of what are referred to here as alkaline substances include ammonia, sodium hydroxide and calcium hydroxide. Illustrative examples of acidic substances include inorganic acids such as sulfuric acid, nitric acid, hydrochloric acid, carbonic acid, phosphoric acid and hydrogen peroxide; and organic acids such as formic acid, citric acid, oxalic acid, lactic acid and glycolic acid. The pH of the copper compound-containing precursor aqueous solution obtained at this time is from 1 to 7, with a pH of from 4 to 7 being preferred from the standpoint of safety during handling.

Step (2):

In Step (2), the copper compound-containing precursor aqueous solution obtained in Step (1) is furnished to a hydrothermal reaction under high pressure and a temperature of from 80 to 250° C., preferably from 100 to 250° C., and more preferably from 120 to 250° C. From the standpoint of reaction efficiency and controllability, a reaction temperature of from 80 to 250° C. is appropriate. As a result, the product settles out as copper-containing titanium oxide fine particles. The pressure is from about 0.12 MPa to about 4.5 MPa, preferably from about 0.15 MPa to about 4.5 MPa, and more preferably from about 0.20 MPa to about 4.5 MPa. The reaction time is from 1 to 300 minutes, and preferably from 1 to 240 minutes.

Step (2) thus provides a copper-containing titanium oxide fine particle dispersion composed of peroxotitanium component and copper component-containing titanium oxide fine particles which are dispersed within an aqueous dispersion medium. Here, as noted above, "peroxotitanium component" refers to titanium oxide compounds containing Ti—O—O—Ti bonds, inclusive of peroxotitanium complexes formed by reacting peroxotitanic acid and Ti(VI) with hydrogen peroxide. Also, "copper component" refers to metallic copper-containing copper-based compounds, inclusive of the above-described copper compounds.

The content of the peroxotitanium component within the copper-containing titanium oxide fine particle dispersion obtained in Step (2) and the average particle size of the titanium oxide fine particles preferably fall within the respective above-indicated ranges for the reasons given above.

The concentration of titanium oxide fine particles in the copper-containing titanium oxide fine particle dispersion is preferably from 0.01 to 20 wt %, and more preferably from 0.5 to 10 wt %. The reason is that, when this dispersion is mixed together with the tungsten oxide fine particle dispersion to obtain the final titanium oxide-tungsten oxide composite photocatalytic fine particle dispersion in subsequently described Step (3), arranging beforehand to have the final amounts of titanium oxide fine particles and tungsten oxide fine particles fall within their combined concentration range is convenient also from the standpoint of operations such as storage and control of the dispersion.

Because the resulting copper-containing titanium oxide fine particle dispersion has been produced via a hydrothermal reaction that crystallizes a copper compound-containing aqueous solution of peroxotitanic acid under high pressure and heating, the copper component is incorporated by entering into solid solution within the crystal lattice of the titanium oxide fine particles. Therefore, the copper coordination state is stable and not easily altered on exposure to heat or ultraviolet radiation, enabling the formation of a highly durable photocatalytic thin-film.

The stability of the copper-containing titanium oxide fine particles within the copper-containing titanium oxide fine particle dispersion when exposed to heat or ultraviolet irradiation can be determined for example by heating and drying the dispersion at 100° C. to obtain a copper-containing titanium oxide dry powder, and examining the copper coordination states before and after exposure of the dry powder to heat or ultraviolet radiation by XAFS (x-ray absorption edge fine structure) spectral analysis.

The copper-containing titanium oxide fine particles within the dispersion of the invention, even after deterioration treatment of the particles by 200 hours of irradiation with ultraviolet light having a peak wavelength of 365 nm at 3 mW/cm$^2$ or by 2 hours of heating at 500° C., in measurement of the Cu—K edge XAFS (x-ray absorption fine structure) spectrum near an energy level of 9,000 eV, satisfy both of the following conditions relative to before such deterioration treatment:

(1) the absorption spectrum maximum peak observable within the range of 8,970 to 9,000 eV in an XANES (x-ray absorption near-edge structure) spectrum changes no more than 0.1 in relative absorption amount and changes no more than 5%, preferably no more than 4%, and more preferably no more than 3%, in absorption energy value; and (2) in the radial structure function obtained by high-speed Fourier transformation of the $k^3_\chi(k)$ Cu—K edge EXAFS (extended x-ray absorption fine structure) spectrum of the same measurement results, the position of the maximum peak within the range of 2 to 3 Å judged to be the first to second coordination sphere of copper changes no more than 5%, preferably no more than 4%, and more preferably no more than 3%.

Such stability of the copper coordination state is achieved because the copper component, rather than having simply been mixed with, adsorbed to or supported on the titanium oxide fine particles, has been incorporated by entering into solid solution within the crystal lattice of the titanium oxide fine particles.

Step (3):

In Step (3), the final titanium oxide-tungsten oxide composite photocatalytic fine particle dispersion is obtained by mixing the copper-containing titanium oxide fine particle dispersion produced in Step (2) together with a separately prepared tungsten oxide fine particle dispersion. The mixing method is not particularly limited, and may consist of agitation with an agitator or dispersion with an ultrasonic disperser. The temperature at the time of mixture is preferably from 20 to 100° C., and the mixing time is preferably from 1 minute to 3 hours. The mixing proportions, expressed as the weight ratio ($TiO_2$:Cu)/$WO_3$, is preferably from 99 to 0.01, more preferably from 9 to 0.1, and even more preferably from 4 to 0.25. When this weight ratio is more than 99 or less than 0.01, the visible light activity may be insufficient.

As used herein, "composite" refers to a mixture of the above-described titanium oxide fine particles and tungsten oxide fine particles. In other words, this means that the titanium oxide fine particles and the tungsten oxide fine particles are each present within the same dispersion medium as separate particles. However, some portion of the titanium oxide fine particles and the tungsten oxide fine particles may be present after having united with each other by adsorption, bonding or the like.

The tungsten oxide fine particle dispersion used in Step (3) is not particularly limited, provided the dispersion is one where tungsten oxide fine particles having the above-indicated average particle size are dispersed within the above-described aqueous dispersion medium. Such tungsten oxide fine particle dispersions may be produced by, for example, using a bead mill that employs spherical zirconia beads having a diameter of 5 to 100 μm, preferably 10 to 50 μm, and more preferably 10 to 30 μm, (such as that available from Ashizawa Finetech Ltd. under the trade name "Nano Getter") to finely grind and disperse a tungsten oxide powder in an aqueous dispersion medium. To prevent a photocatalytic activity from emerging, it is preferable that an organic dispersant not be used here in the fine grinding and dispersing operation.

The concentration of tungsten oxide fine particles in the tungsten oxide fine particle dispersion is preferably from 0.01 to 20 wt %, and more preferably from 0.5 to 10 wt %. The reason is that, when this dispersion is mixed together with the titanium oxide fine particle dispersion in Step (3) to obtain the final titanium oxide-tungsten oxide composite photocatalytic fine particle dispersion, arranging beforehand to have the final amounts of titanium oxide fine particles and tungsten oxide fine particles fall within their combined concentration range is convenient also from the standpoint of operations such as storage and control of the dispersion.

To facilitate application of the dispersion to the surfaces of the various subsequently described members and also to facilitate bonding of the fine particles, the resulting titanium oxide-tungsten oxide composite photocatalytic fine particle dispersion may have added thereto a binder, especially a silicone compound-based binder, in a proportion (expressed as the weight ratio of silicon compound to titanium oxide) of preferably from 1:99 to 99:1, more preferably from 10:90 to 90:10, and even more preferably from 30:70 to 70:30. As used herein, "silicon compound-based binder" refers to a colloidal dispersion, solution or emulsion of a silicon compound, and is made up of a solid or liquid silicon compound within an aqueous dispersion medium. Illustrative examples include colloidal silica, solutions of silicic acid salts such as silicate, silane or siloxane hydrolyzate emulsions, silicone resin emulsions, and emulsions of copolymers of a silicone resin with another resin, such as a silicone-acrylic resin copolymer or a silicone-urethane resin copolymer.

[Member Having Photocatalytic Thin-Film on Surface]

The titanium oxide-tungsten oxide composite photocatalytic fine particle dispersion of the invention may be used to form a photocatalytic film on the surface of various types of members. No particular limitation is imposed here on the types of members. Examples of materials of which the member may be composed include organic materials and inorganic materials. Such members may have a variety of shapes according to their respective purposes and applications.

Illustrative examples of organic materials include synthetic resins such as vinyl chloride resins (PVC), polyethylene (PE), polypropylene (PP), polycarbonates (PC), acrylic resins, polyacetals, fluororesins, silicone resins, ethylene-vinyl acetate copolymers (EVA), acrylonitrile-butadiene rubbers (NBR), polyethylene terephthalate (PET), polyethylene naphthalate (PEN), polyvinyl butyral (PVB), ethylene-vinyl alcohol copolymers (EVOH), polyimide resins, polyphenylene sulfides (PPS), polyetherimides (PEI), polyetheretherimides (PEEI), polyetheretherketones (PEEK), melamine resins, phenolic resins and acrylonitrile-butadiene-styrene (ABS) resins; natural materials such as natural rubbers; and semi-synthetic materials made of both a synthetic resin material and a natural material. These materials may be rendered into products of a required shape and construction, such as films, sheets, textile materials, textile products and other moldings or laminates.

Inorganic materials include nonmetallic inorganic materials and metallic inorganic materials.

Examples of nonmetallic inorganic materials include glass, ceramic and stone. These may be rendered into products of various forms, such as tile, glass, mirrors, walls and decorative materials.

Examples of metallic inorganic materials include cast iron, steel, iron, ferrous alloys, aluminum, aluminum alloys, nickel, nickel alloys and diecast zinc. These may be plated with the above metal inorganic materials or coated with the above organic materials, or may be platings applied to the surface of the above organic materials or nonmetallic inorganic materials.

The method of forming a photocatalyst film on the surface of various types of members may be one in which the visible light-sensitive photocatalytic fine particle dispersion is coated onto the surface of the member by a known coating method such as spray coating or dip coating, then dried by a known drying method such as air drying, hot-air drying, far-infrared drying or drying by induction heating. The thickness of the photocatalytic film may be variously selected, although a thickness in the range of 30 nm to 10 μm is generally preferred.

The photocatalytic film formed in the above manner is transparent and provides, as in the prior art, a good photocatalytic effect when exposed to light in the ultraviolet region (10 to 400 nm), in addition to which it also achieves an excellent photocatalytic effect even when exposed only to light in the visible region (400 to 800 nm) from which conventional photocatalysts have been unable to obtain a sufficient catalytic effect. Owing to the photocatalytic effects, various types of members on which this photocatalytic film has been formed decompose organic matter adsorbed to the surface, thus making it possible to exhibit effects such cleaning, deodorizing and disinfection of the member surface. Moreover, by using a copper-containing titanium oxide, such photocatalytic films are able to exhibit an antibacterial activity even in places where substantially no ultraviolet or visible light falls and little if any photocatalytic effects would otherwise be expected.

EXAMPLES

The invention is illustrated more fully below by way of Working Examples and Comparative Examples, although these Examples are not intended to limit the invention. The various measurements in the invention were carried out as described below.

(1) Average Particle Sizes ($D_{50}$) of Titanium Oxide Fine Particles and Tungsten Oxide Fine Particles The average particle sizes ($D_{50}$) of the titanium oxide fine particles and the tungsten oxide fine particles were measured using a particle size analyzer (trade name: "Nanotrac UPA-EX150"; from Nikkiso Co., Ltd.)

(2) Presence of Peroxotitanium Component Included in Titanium Oxide Fine Particles The presence of the peroxotitanium component included in the titanium oxide fine particles was confirmed by the presence or absence of the O—O bonds in peroxo groups.

Specifically, the titanium oxide fine particle dispersion obtained was air-dried at room temperature and the resulting powder of titanium oxide fine particles was measured with an infrared spectrophotometer (trade name: "System 2000"; from Perkin Elmer), from which the presence or absence of a O—O bond peak near 900 $cm^{-1}$ was checked.

(3) Concentration of Peroxotitanium Component Included in Titanium Oxide Fine Particle Dispersion The concentration of the peroxotitanium component included in the titanium oxide fine particle dispersion was measured by hydrogen peroxide absorptiometry. Specifically, the titanium oxide fine particle dispersion was rendered acidic with sulfuric acid, thereby effecting a reaction with peroxotitanium component and coloration, following which the 410 nm wavelength intensity was measured using a UV/Vis/NIR spectrophotometer (trade name: LAMDA 950; from Perkin Elmer). The concentration was calculated from the relative intensity with a Ti standard solution.

(4) Exposure of Copper-Containing Titanium Oxide to Ultraviolet Light

Using a UV-LED light (model number: HLDL-432x336UV365-FN; from CCS Inc.), the copper-containing titanium oxide dry powder was irradiated for 200 hours with ultraviolet light adjusted to an UV intensity at the sample surface of 3 $mW/cm^2$ and a peak wavelength of 365 nm.

(5) Exposure of Copper-Containing Titanium Oxide to Heat

The copper-containing titanium oxide dry powder was exposed to heat for 2 hours at 500° C. in an electric oven.

(6) Copper Coordination State in Copper-Containing Titanium Oxide

X-ray absorption spectroscopy (XAS) was used to evaluate the copper coordination state in the copper-containing titanium oxide. That is, Cu—K absorption edge XAFS (x-ray absorption fine structure) spectra were measured in accordance with the procedure in (a) to (c) below using beamline BL14B2 at the JASRI (Japan Synchrotron Radiation Research Institute) Spring-8 synchrotron irradiation facility and making use of a transmission method measurement unit at the facility.

(a) Sample Preparation:

The samples were all rendered into dry powders and mixed with a given amount of BN (boron nitride, reagent grade from Kanto Kagaku) such that the absorption coefficient μt becomes 1 when the powder is formed into a 0.5 mm thick pellet, following which the mixtures were pressed into 0.5 mm pellets with a tablet press.

(b) Measurement:

The pellets were enclosed in clear polypropylene bags and were all set in an autosampler in the BL14B2 hutch, and the x-ray absorption spectra near 8,800 to 9,600 eV were all measured by the transmission method.

(c) Analysis:

The resulting spectral data were analyzed with IfeFFit using the GUI front ends "Athena" and "Artemis". Utilizing the XANES region for comparative assessment of the spectra, when the maximum peak observed within the range of 8,970 to 9,000 eV in the absorption spectrum changed no more than 0.1 in relative absorption amount and changed no more than 5% from the original absorption energy value as compared with prior to deterioration treatment, the sample was rated as "Good"; when spectral changes were observed such that either of these conditions was not satisfied, the sample was rated as "NG".

With regard to the EXAFS function $k^3_\chi$ (k), the radial structure function was obtained by high-speed Fourier transformation, and the position of the peak observable within 2 to 3 Å for the second coordination sphere of copper was comparatively evaluated with the results obtained for a blank.

(7) Test of Photocatalytic Thin-Film Performance in Decomposition of Acetaldehyde Gas (Under LED Irradiation)

The activity of a photocatalytic thin-film produced by coating and drying the dispersion was evaluated by a decomposition reaction on acetaldehyde gas. Evaluation was carried out as follows by a batch-type method for evaluating gas decomposition performance.

An evaluation sample obtained by forming a 50 mg photocatalyst thin-film on an A4-size PET film was set within a 5 L capacity stainless steel cell having a quartz glass window, following which the cell was filled with 5 ppm concentration acetaldehyde gas moisture-conditioned to 50% humidity, and was exposed to an illuminance of 30,000 lux with an LED light (model number: TH-211x200SW; from CCS Inc.) positioned at the top of the cell. When acetaldehyde gas decomposes on account of the photocatalyst on the thin-film, the acetaldehyde gas concentration within the cell decreases. By measuring the concentration, it is possible to determine the amount of acetaldehyde gas that has decomposed. The acetaldehyde gas concentration was measured with a photoacoustic multigas monitor (trade name: INNOVA 1412, from LumaSense Technologies Inc.), and evaluation was carried out by comparing the concentration of remaining acetaldehyde gas after 12 hours of irradiation.

(8) Test of Photocatalyst Thin-Film Durability to Ultraviolet Light (Under UV-LED Irradiation)

Using a UV-LED light (model number: HLDL-432x336UV365-FN; from CCS Inc.), the evaluation sample produced in (7) above was irradiated 200 hours with ultraviolet light adjusted to a UV intensity at the sample surface of 3 $mW/cm^2$.

An acetaldehyde gas decomposition performance test under LED irradiation was carried out in the same way as in (7) above on the sample obtained after 200 hours of irradiation, the percent decomposition of the samples before and after UV irradiation were compared, and evaluation was carried out according to the following criteria.

Percent acetaldehyde gas decomposition by sample before UV irradiation—Percent acetaldehyde gas decomposition by sample after UV irradiation Good: Difference was 30% or less
Fair: Difference was more than 30% and up to 50%
NG: Difference was more than 50%

Example 1

<Preparation of Titanium Oxide-Tungsten Oxide Composite Photocatalytic Fine Particle Dispersion (α)>

A copper-containing titanium hydroxide precipitate was obtained by adding copper(II) chloride to a 36 wt % aqueous solution of titanium(IV) chloride such that the molar ratio Ti/Cu becomes 20, diluting this mixture ten-fold with pure water, then gradually adding 10 wt % ammonia water to the aqueous solution to effect neutralization and hydrolysis. The pH of the solution at this time was 8. The resulting titanium hydroxide precipitate was deionization treated by repeated addition of pure water and decantation. Next, 30 wt % hydrogen peroxide water was added to the deionized copper-containing titanium hydroxide precipitate such that the molar ratio hydrogen peroxide/titanium hydroxide becomes 6.0 or more, after which the system was stirred one day and night at room temperature to fully effect the reaction. The concentration was subsequently adjusted by adding pure water, giving a clear, yellowish green-colored copper-containing peroxotitanic acid solution (t-i) (solids concentration, 1 wt %).

A 500 mL autoclave was charged with 400 mL of the peroxotitanic acid solution (t-i), and this was hydrothermally treated for 180 minutes under conditions of 130° C. and 0.3 MPa. The reaction mixture within the autoclave was then discharged through a sampling tube into a vessel held in a 25° C. water bath and rapidly cooled, thereby stopping the reaction and giving a copper-containing titanium oxide fine particle dispersion (T-i).

Measurements were carried out on the resulting copper-containing titanium oxide fine particle dispersion (T-i) to determine the average particle size of the titanium oxide fine particles, check for the presence of the peroxotitanium component included in the titanium oxide fine particles, and determine the concentration of the peroxotitanium component included in the titanium oxide fine particles. In addition, the titanium oxide fine particle dispersion was dried under heating at 100° C. to give a titanium oxide dry powder, and XAFS spectra were measured respectively for this titanium oxide dry powder as is, for the powder following the above-described exposure to ultraviolet light, and for the powder following the above-described exposure to heat.

Tungsten oxide powder (Kojundo Chemical Laboratory Co., Ltd.) was finely ground and dispersed in water using a bead mill (trade name: Nano Getter; from Ashizawa Finetech Ltd.), following which the dispersion was passed through a 1 μm filter to remove coarse particles, thereby giving a tungsten oxide fine particle dispersion (W-i) (solids concentration, 1 wt %).

Average particle size measurement of the tungsten oxide fine particles was carried out from the tungsten oxide fine particle dispersion (W-i) thus obtained.

A titanium oxide-tungsten oxide composite photocatalytic fine particle dispersion (α) was obtained by mixing together copper-containing titanium oxide fine particle dispersion (T-i) and tungsten oxide fine particle dispersion (W-i) in the weight ratio (T-i):(W-i)=50:50.

A liquid coating for evaluation was produced by adding a silica-based binder (colloidal silica, available as Snowtex® 20 from Nissan Chemical Industries, Ltd.) to the titanium oxide-tungsten oxide composite photocatalytic fine particle dispersion (α) in the weight ratio ($TiO_2$+$WO_3$)/$SiO_2$ of 1.5.

Using a #7 wire bar coater, the liquid coating for evaluation was coated onto an A4-size PET film in such a way as to form a 50 mg photocatalytic thin-film, thereby giving a sample for evaluation of the acetaldehyde gas decomposition performance. The percent gas decomposition by this photocatalytic thin-film was measured using the batch-type gas decomposition performance evaluation method, whereupon the percent gas decomposition after 12 hours of LED irradiation was 100%.

Following measurement of the acetaldehyde decomposition performance, the same sample was irradiated for 200 hours with a UV-LED light adjusted so as to set the ultraviolet light intensity to 3 mW/cm$^2$. Measurement of the acetaldehyde decomposition performance was then again carried out, whereupon the gas decomposition percentage after 12 hours of LED irradiation was 100% ("Good").

The A4-size PET film with a photocatalytic thin-film formed thereon that was produced as described above was cut into 50 mm squares and tested in accordance with JIS Z 2810 ("Antibacterially Treated Products: Antibacterial Test Method and Antibacterial Activity").

The antibacterial activity value R in an antibacterial activity test on *Escherichia coli* was 3.52 and the antibacterial activity value R in an antibacterial activity test on *Staphylococcus aureus* was 5.17, thus demonstrating high antibacterial effects.

Example 2

<Preparation of Titanium Oxide-Tungsten Oxide Composite Photocatalytic Fine Particle Dispersion (β)>

Aside from mixing together copper-containing titanium oxide fine particle dispersion (T-i) and tungsten oxide fine particle dispersion (W-i) in the mixing ratio (by weight) of (T-i):(W-i)=90:10, a titanium oxide-tungsten oxide composite photocatalytic fine particle dispersion (β) was obtained in the same way as in Example 1, and assessment of the photocatalytic activity was carried out.

Example 3

<Preparation of Titanium Oxide-Tungsten Oxide Composite Photocatalytic Fine Particle Dispersion (γ)>

Aside from mixing together copper-containing titanium oxide fine particle dispersion (T-i) and tungsten oxide fine particle dispersion (W-i) in the mixing ratio (by weight) of (T-i):(W-i)=30:70, a titanium oxide-tungsten oxide composite photocatalytic fine particle dispersion (γ) was obtained in the same way as in Example 1, and assessment of the photocatalytic activity was carried out.

Example 4

<Preparation of Titanium Oxide-Tungsten Oxide Composite Photocatalytic Fine Particle Dispersion (δ)>

Aside from using LUMI-RESH (W-ii) (a Cu/$WO_3$-based photocatalyst available from Showa Denko K.K.; solids concentration, 1 wt %) instead of tungsten oxide fine particle dispersion (W-i), a titanium oxide-tungsten oxide composite photocatalytic fine particle dispersion (δ) was obtained in the same way as in Example 1, and assessment of the photocatalytic activity was carried out.

Example 5

<Preparation of Titanium Oxide-Tungsten Oxide Composite Photocatalytic Fine Particle Dispersion (ε)>

A copper-containing titanium hydroxide precipitate was obtained by adding copper(II) chloride to a 36 wt % aqueous solution of titanium(IV) chloride such that the molar ratio Ti/Cu becomes 200, diluting this mixture ten-fold with pure water, then gradually adding 10 wt % ammonia water to the aqueous solution to effect neutralization and hydrolysis. The pH of the solution at this time was 8. The resulting titanium hydroxide precipitate was deionization treated by repeated addition of pure water and decantation. Next, 30 wt % hydrogen peroxide water was added to the deionized copper-containing titanium hydroxide precipitate such that the hydrogen peroxide/titanium hydroxide becomes 6.0 or more, after which the system was stirred one day and night at room temperature to fully effect the reaction. The concentration was subsequently adjusted by adding pure water, giving a clear, yellowish green-colored copper-containing peroxotitanic acid solution (t-ii) (solids concentration, 1 wt %).

A 500 mL autoclave was charged with 400 mL of the peroxotitanic acid solution (t-ii), and this was hydrothermally treated for 180 minutes under conditions of 130° C. and 0.3 MPa. The reaction mixture within the autoclave was then discharged through a sampling tube into a vessel held in a 25° C. water bath and rapidly cooled, thereby stopping the reaction and giving a titanium oxide fine particle dispersion (T-ii).

Measurements were carried out on the resulting titanium oxide fine particle dispersion (T-ii) to determine the average particle size of the titanium oxide fine particles, check for the presence of the peroxotitanium component included in the titanium oxide fine particles, and determine the concentration of the peroxotitanium component included in the titanium oxide fine particles. In addition, the titanium oxide fine particle dispersion was dried under heating at 100° C. to give a titanium oxide dry powder, and XAFS spectra were measured respectively for this titanium oxide dry powder as is, for the powder following the above-described exposure to ultraviolet light, and for the powder following the above-described exposure to heat.

Aside from mixing together the copper-containing titanium oxide fine particle dispersion (T-ii) and the tungsten oxide fine particle dispersion (W-i) in a weight ratio (T-ii):(W-i)=50:50, a titanium oxide-tungsten oxide composite photocatalytic fine particle dispersion (ε) was obtained in the same way as in Example 1 and assessment of the photocatalytic activity was carried out.

Example 6

A titanium hydroxide precipitate was obtained by diluting a 36 wt % aqueous solution of titanium(IV) chloride ten-fold with pure water, then gradually adding 10 wt % ammonia water to the aqueous solution to effect neutralization and hydrolysis. The pH of the solution at this time was 8. The resulting titanium hydroxide precipitate was deionization treated by repeated addition of pure water and decantation. Next, 30 wt % hydrogen peroxide water was added to the deionized titanium hydroxide precipitate such that the hydrogen molar ratio peroxide/titanium hydroxide becomes 6.0 or more, after which the system was stirred one day and night at room temperature to fully effect the reaction. The concentration was subsequently adjusted by adding pure water, giving a clear, yellow-colored peroxotitanic acid solution (t-iii) (solids concentration, 1 wt %).

A 500 mL autoclave was charged with 400 mL of the peroxotitanic acid solution (t-iii), and this was hydrothermally treated for 180 minutes under conditions of 130° C. and 0.3 MPa. The reaction mixture within the autoclave was then discharged through a sampling tube into a vessel held in a 25° C. water bath and rapidly cooled, thereby stopping the reaction and giving a titanium oxide fine particle dispersion (T-iii).

Measurements were carried out on the resulting titanium oxide fine particle dispersion (T-iii) to determine the average particle size of the titanium oxide fine particles, check for the presence of the peroxotitanium component included in the titanium oxide fine particles, and determine the concentration of the peroxotitanium component included in the titanium oxide fine particles.

Copper(II) chloride was added to the titanium oxide fine particle dispersion (T-iii) such as to set the molar ratio Ti/Cu to 20, giving titanium oxide dispersion (T-v).

The titanium oxide fine particle dispersion (T-v) and the tungsten oxide fine particle dispersion (W-i) were mixed together in a weight ratio (T-v):(W-i)=50:50, thereby giving a photocatalytic fine particle dispersion (θ). The photocatalytic activity was evaluated in the same way as in Example 1.

Comparative Example 1

The photocatalytic activity of the copper-containing titanium oxide fine particle dispersion (T-i) was evaluated in the same way as in Example 1.

Comparative Example 2

The photocatalytic activity of the tungsten oxide fine particle dispersion (W-i) was evaluated in the same way as in Example 1.

Comparative Example 3

Copper(II) chloride was added to tungsten oxide fine particle dispersion (W-i) such as to set the molar ratio W/Cu to 20, thereby giving tungsten oxide fine particle dispersion (W-iii). The photocatalytic activity was evaluated in the same way as in Example 1.

Comparative Example 4

The titanium oxide fine particle dispersion (T-iii) and the tungsten oxide fine particle dispersion (W-i) were mixed together in the weight ratio (T-iii):(W-i)=50:50, thereby giving photocatalytic fine particle dispersion (ζ). The photocatalytic activity was evaluated in the same way as in Example 1.

Comparative Example 5

Aside from hydrothermally treating peroxotitanic acid solution (t-i) for 420 hours at 0.5 MPa and 150° C., a copper-containing titanium oxide fine particle dispersion (T-iv) was obtained in the same way as in Example 1.

Measurements were carried out on the resulting titanium oxide fine particle dispersion (T-iv) to determine the average particle size of the titanium oxide fine particles, check for the presence of the peroxotitanium component included in the titanium oxide fine particles, and determine the concentration of the peroxotitanium component included in the titanium oxide fine particles.

The titanium oxide fine particle dispersion (T-iv) and the tungsten oxide fine particle dispersion (W-i) were mixed together in a weight ratio (T-iv):(W-i)=50:50, thereby giving a photocatalytic fine particle dispersion (η). The photocatalytic activity was evaluated in the same way as in Example 1

TABLE 1

| Titanium oxide dispersion | Peroxotitanium component | | | Ti/Cu molar ratio | Acceleration of deterioration | XANES | EXAFS radial structure function evaluation | | Rating |
| --- | --- | --- | --- | --- | --- | --- | --- | --- | --- |
| | Average particle size (nm) | Presence of O—O bonds | Concentration in dispersion (%) | | | | Second coordination sphere peak position (Å) | Difference with blank (%) | |
| T-i | 9.7 | good | 0.5 | 20 | none (blank) | — | 2.607 | — | good |
| | | | | | UV irradiation | good | 2.573 | 1.304 | |
| | | | | | 500° C. heating | good | 2.602 | 0.192 | |
| T-ii | 22.5 | good | 0.24 | 200 | none (blank) | — | 2.627 | — | good |
| | | | | | UV irradiation | good | 2.591 | 1.370 | |
| | | | | | 500° C. heating | good | 2.557 | 2.665 | |
| T-iii | 17.2 | good | 0.5 | 0 | none (blank) | — | — | — | — |
| | | | | | UV irradiation | — | — | — | |
| | | | | | 500° C. heating | — | — | — | |
| T-iv | 75 | NG | 0.02 | 20 | none (blank) | — | — | — | — |
| | | | | | UV irradiation | — | — | — | |
| | | | | | 500° C. heating | — | — | — | |
| T-v | 10.2 | good | 0.5 | 20 (CuCl₂ added later) | none (blank) | — | 2.6331 | — | NG |
| | | | | | UV irradiation | good | 2.4802 | 5.087 | |
| | | | | | 500° C. heating | good | 2.4665 | 6.327 | |

TABLE 2

| Tungsten oxide dispersion | Average particle size (nm) |
| --- | --- |
| W-i | 320 |
| W-ii | 176 |
| W-iii | 468 |

TABLE 3

| | | Make-up of photocatalytic dispersion | | | | Gas decomposition | | Rating |
| --- | --- | --- | --- | --- | --- | --- | --- | --- |
| | | Photocatalytic dispersion | Titanium oxide dispersion | Tungsten oxide dispersion | Mixing ratio | Before UV exposure (%) | After UV exposure (%) | UV resistance |
| Example | 1 | α | T-i | W-i | 50:50 | 100 | 100 | good |
| | 2 | β | T-i | W-i | 90:10 | 100 | 100 | good |
| | 3 | γ | T-i | W-i | 30:70 | 100 | 100 | good |
| | 4 | δ | T-i | W-ii | 50:50 | 100 | 100 | good |
| | 5 | ε | T-ii | W-i | 50:50 | 95 | 93 | good |
| | 6 | θ | T-v | W-i | 50:50 | 100 | 63 | fair |
| Comparative Example | 1 | T-i | T-i | — | 100:0 | 12 | 10 | good |
| | 2 | W-i | — | W-i | 0:100 | 25 | 25 | good |
| | 3 | W-iii | — | W-iii | 0:100 | 87 | 43 | NG |
| | 4 | ζ | T-iii | W-i | 50:50 | 19 | 18 | good |
| | 5 | η | T-iv | W-i | 50:50 | 33 | 31 | good |

From the results in Examples 1 to 3 and Comparative Examples 1 and 2, it is apparent that forming a composite of titanium oxide fine particles and tungsten oxide fine particles increases the visible light sensitivity.

From the results in Comparative Examples 2 and 3, it is apparent that directly mixing a copper compound with, or supporting a copper compound on, tungsten oxide fine particles increases the visible light activity but lowers the performance following UV exposure and thus results in a low durability.

From the results in Examples 1 and 5 and Comparative Example 4, it is apparent that the visible light activity rises when the titanium oxide from which the composite is formed includes copper.

From the results in Example 1 and Comparative Example 5, it is apparent that when the peroxotitanium component concentration within the titanium oxide and the dispersion is low, the average particle size becomes larger and the visible light sensitivity cannot be sufficiently increased.

From the results in Example 6, it is apparent that when the copper component has not entered into solid solution within the titanium oxide fine particles, although the UV resistance tends to decrease, an advantageous effect from formation of the composite with tungsten oxide fine particles can be confirmed.

INDUSTRIAL APPLICABILITY

The titanium oxide-tungsten oxide fine particle dispersion of the invention is useful for producing a photocatalytic thin-film by application to various types of substrates made of inorganic materials such as glass or metal or made of organic materials such as polymer films (e.g., PET films). The resulting photocatalytic thin-film has a high visible light sensitivity, and thus is particularly suitable for use in indoor applications.

The invention claimed is:

1. A titanium oxide-tungsten oxide composite photocatalytic fine particle dispersion comprising two kinds of photocatalytic fine particles dispersed in an aqueous dispersion medium, wherein
said two kinds of photocatalytic fine particles comprise (i) titanium oxide fine particles containing a peroxotitanium component and a copper component, and (ii) tungsten oxide fine particles, and
the copper component has entered into solid solution within the titanium oxide fine particles (i).

2. The titanium oxide-tungsten oxide composite photocatalytic fine particle dispersion of claim 1, wherein the dispersed size of the titanium oxide fine particles (i) and the dispersed size of the tungsten oxide fine particles (ii), each expressed as a volume-based 50% cumulative distribution size ($D_{50}$) measured by dynamic laser light scattering, are respectively 5 to 30 nm and 5 to 1,000 nm.

3. The titanium oxide-tungsten oxide composite photocatalytic fine particle dispersion of claim 1, wherein the content of the copper component within the titanium oxide fine particles (i), expressed as a molar ratio with titanium oxide (Ti/Cu), is from 1 to 1,000.

4. The titanium oxide-tungsten oxide composite photocatalytic fine particle dispersion of claim 1 wherein, even after deterioration treatment of the titanium oxide fine particles (i) by 200 hours of irradiation with ultraviolet light having a peak wavelength of 365 nm at 3 mW/cm$^2$ or by 2 hours of heating at 500° C.,
in measurement of the Cu—K edge XAFS (x-ray absorption fine structure) spectrum near an energy level of 9,000 eV, both of the following conditions are satisfied relative to before such deterioration treatment:
1) the absorption spectrum maximum peak observable within the range of 8,970 to 9,000 eV in an XANES (x-ray absorption near-edge structure) spectrum changes no more than 0.1 in relative absorption amount and changes no more than 5% in absorption energy value; and
2) in the radial structure function obtained by high-speed Fourier transformation of the $k^3{}_\chi(k)$ Cu—K edge EXAFS (extended x-ray absorption fine structure) spectrum of the same measurement results, the position of the maximum peak within the range of 2 to 3 Å judged to be the first to second coordination sphere of copper changes no more than 5%.

5. The titanium oxide-tungsten oxide composite photocatalytic fine particle dispersion of claim 1 which further comprises a binder.

6. The titanium oxide-tungsten oxide composite photocatalytic fine particle dispersion of claim 5, wherein the binder is a silicon compound-based binder.

7. A member having on a surface thereof a photocatalytic thin-film formed using the titanium oxide-tungsten oxide composite photocatalytic fine particle dispersion of claim 1.

8. A method of producing a titanium oxide-tungsten oxide composite photocatalytic fine particle dispersion according to claim 1, comprising the steps of:
(1) producing a copper compound-containing precursor aqueous solution from a starting titanium compound, a copper compound, a basic substance, a hydrogen peroxide and an aqueous dispersion medium;
(2) producing a copper-containing titanium oxide fine particle dispersion by heating the copper compound-containing precursor aqueous solution produced in Step (1) for 1 to 300 minutes at from 80 to 250° C. and under pressure of from 0.12 to 4.5 MPa; and
(3) mixing the copper-containing titanium oxide fine particle dispersion produced in Step (2) together with a tungsten oxide fine particle dispersion.

9. The method of producing a titanium oxide-tungsten oxide composite photocatalytic fine particle dispersion according to claim 8, wherein the tungsten oxide fine particle dispersion used in Step (3) is produced by using a bead mill to finely grind and disperse a tungsten oxide powder in an aqueous dispersion medium.

10. The method of producing a titanium oxide-tungsten oxide composite photocatalytic fine particle dispersion according to claim 8, wherein the copper-containing titanium oxide fine particle dispersion obtained in Step (2) has a peroxotitanium component content of from 0.05 to 2 wt % of the titanium oxide fine particles.

11. The method of producing a titanium oxide-tungsten oxide composite photocatalytic fine particle dispersion according to claim 9, wherein the beads used in the bead mill are spherical zirconia beads having a diameter of from 5 to 100 μm.

* * * * *